(12) United States Patent
Nichol et al.

(10) Patent No.: US 9,566,751 B1
(45) Date of Patent: Feb. 14, 2017

(54) METHODS OF FORMING FILM-BASED LIGHTGUIDES

(71) Applicant: Flex Lighting II LLC, Chicago, IL (US)

(72) Inventors: Anthony J. Nichol, Chicago, IL (US); Zane A. Coleman, Elmhurst, IL (US)

(73) Assignee: Flex Lighting II, LLC, Chicago, IL (US)

( * ) Notice: Subject to any disclaimer, the term of this patent is extended or adjusted under 35 U.S.C. 154(b) by 168 days.

(21) Appl. No.: 14/206,846

(22) Filed: Mar. 12, 2014

Related U.S. Application Data (60) Provisional application No. 61/777,525, filed on Mar. 12, 2013.

(51) Int. Cl.
*B26D 9/00* (2006.01)
*B29D 11/00* (2006.01)
*F21V 8/00* (2006.01)

(52) U.S. Cl.
CPC ........... *B29D 11/00663* (2013.01); *B26D 9/00* (2013.01); *G02B 6/0001* (2013.01)

(58) Field of Classification Search
None
See application file for complete search history.

(56) References Cited

U.S. PATENT DOCUMENTS

| | | |
|---|---|---|
| 2,732,688 A | 1/1956 | Dickson |
| 3,535,537 A | 10/1970 | Powell |
| 3,933,556 A | 1/1976 | Strack |
| 4,026,693 A | 5/1977 | Sato |
| 4,151,582 A | 4/1979 | Grunberger |
| 4,228,267 A | 10/1980 | Higashizume et al. |
| 4,389,698 A | 6/1983 | Cibie |
| 4,422,719 A | 12/1983 | Orcutt |
| 4,511,215 A | 4/1985 | Butler |
| 4,551,985 A | 11/1985 | Kovach |
| 4,592,717 A | 6/1986 | Albert |
| 4,667,481 A | 5/1987 | Watanabe et al. |
| 4,824,194 A | 4/1989 | Karasawa |
| 4,869,570 A | 9/1989 | Yokohama |
| 4,974,354 A | 12/1990 | Hembrook, Jr. |
| 5,009,483 A | 4/1991 | Rockwell, III |

(Continued)

FOREIGN PATENT DOCUMENTS

| | | |
|---|---|---|
| CN | 1206661 | 2/1999 |
| CN | 1981221 | 6/2007 |

(Continued)

OTHER PUBLICATIONS

Rizzo, et al., "The recovery after bending of polycarbonate sheets." Rheol. Acta 20, 133-138 (1981), ISSN 0035-4511, p. 138, in 1-2.

(Continued)

*Primary Examiner* — Charlie Y Peng
(74) *Attorney, Agent, or Firm* — Zane Coleman (57) ABSTRACT

A method of manufacturing a lightguide includes cutting into a first region of a film using a first cutting process with a first cutting device to form a plurality of slits in the film defining lateral edges for each of a plurality of coupling lightguides extending from a body of a film, and cutting in a second region of the film different than the first region using a second cutting process different than the first cutting process with a second cutting device.

20 Claims, 3 Drawing Sheets

(56) References Cited

U.S. PATENT DOCUMENTS

| | | |
|---|---|---|
| 5,106,181 A | 4/1992 | Rockwell, III |
| 5,134,857 A | 8/1992 | Burley |
| 5,165,187 A | 11/1992 | Shahidi-Hamedani et al. |
| 5,315,673 A | 5/1994 | Stetter et al. |
| 5,328,376 A | 7/1994 | West |
| 5,359,691 A | 10/1994 | Tai et al. |
| 5,379,539 A | 1/1995 | Hannula |
| 5,390,436 A | 2/1995 | Ashall |
| 5,506,929 A | 4/1996 | Tai et al. |
| 5,544,268 A | 8/1996 | Bischel |
| 5,596,671 A | 1/1997 | Rockwell, III |
| 5,661,839 A | 8/1997 | Whitehead |
| 5,737,472 A | 4/1998 | Bernasson et al. |
| 5,786,665 A | 7/1998 | Ohtsuki et al. |
| 5,789,710 A | 8/1998 | Vanderpoel |
| 5,818,554 A | 10/1998 | Hiyama et al. |
| 5,888,324 A | 3/1999 | Nakamura |
| 5,938,991 A | 8/1999 | Pollock |
| 6,049,641 A | 4/2000 | Deacon |
| 6,068,381 A | 5/2000 | Ayres |
| 6,208,788 B1 | 3/2001 | Nosov |
| RE37,186 E | 5/2001 | Hill |
| 6,224,269 B1 | 5/2001 | Engstrand et al. |
| 6,315,433 B1 | 11/2001 | Cavello |
| 6,490,090 B1 | 12/2002 | Kumazawa |
| 6,490,401 B2 | 12/2002 | Corneilissen et al. |
| 6,498,882 B1 | 12/2002 | Buckelew et al. |
| 6,577,359 B2 | 6/2003 | Ishihara |
| 6,592,233 B1 | 7/2003 | Parikka |
| 6,641,880 B1 | 11/2003 | Deyak et al. |
| 6,700,054 B2 | 3/2004 | Cherney et al. |
| 6,750,996 B2 | 6/2004 | Jagt et al. |
| 6,825,895 B2 | 11/2004 | Nakano et al. |
| 6,846,082 B2 | 1/2005 | Glent-Madsen et al. |
| 6,847,424 B2 | 1/2005 | Gotoh et al. |
| 6,964,226 B2 | 11/2005 | Weiss et al. |
| 7,004,610 B2 | 2/2006 | Yamashita et al. |
| 7,108,414 B2 | 9/2006 | McCollum et al. |
| 7,190,425 B2 | 3/2007 | Hong |
| 7,237,396 B1 | 7/2007 | Nichol |
| 7,275,850 B2 | 10/2007 | Nesterenko et al. |
| 7,406,245 B2 | 7/2008 | Page et al. |
| 7,411,142 B2 | 8/2008 | Jung et al. |
| 7,430,355 B2 | 9/2008 | Heikenfeld et al. |
| 7,452,120 B2 | 11/2008 | Lee et al. |
| 7,457,509 B2 | 11/2008 | Haenen et al. |
| 7,490,967 B2 | 2/2009 | Syribeys |
| 7,534,022 B2 | 5/2009 | Chou |
| 7,542,635 B2 | 6/2009 | Coleman |
| 7,565,054 B2 | 7/2009 | Rinko |
| 7,582,000 B2 | 9/2009 | Pendlebury et al. |
| 7,639,916 B2 | 12/2009 | Fine |
| 7,729,941 B2 | 6/2010 | Zampini, II et al. |
| 7,742,120 B2 | 6/2010 | Bayley et al. |
| 7,750,886 B2 | 7/2010 | Sampsell |
| 7,751,663 B2 | 7/2010 | Van Ostrand |
| 7,773,849 B2 | 8/2010 | Shani |
| 7,780,329 B2 | 8/2010 | McCollum et al. |
| 8,013,831 B2 | 9/2011 | Sampsell |
| 8,128,271 B2 | 3/2012 | Nichol |
| 8,164,703 B2 | 4/2012 | Cheng |
| 8,167,461 B2 | 5/2012 | Nichol |
| 8,231,256 B1 | 7/2012 | Coleman et al. |
| 8,434,909 B2 | 5/2013 | Nichol |
| 8,439,545 B2 | 5/2013 | Cheong |
| 8,794,809 B2 | 8/2014 | Lundin |
| 2002/0015563 A1 | 2/2002 | Murakami |
| 2002/0028600 A1 | 3/2002 | Kondo |
| 2003/0016930 A1 | 1/2003 | Inditsky |
| 2003/0174953 A1 | 9/2003 | Carnevale et al. |
| 2003/0198456 A1 | 10/2003 | Steiner |
| 2004/0093779 A1 | 5/2004 | Blach |
| 2004/0228104 A1 | 11/2004 | Birman |
| 2004/0231481 A1* | 11/2004 | Floding .................. B26D 1/025 83/425 |
| 2005/0072032 A1 | 4/2005 | McCollum et al. |
| 2005/0091886 A1 | 5/2005 | Kim |
| 2005/0219148 A1 | 10/2005 | Bayley et al. |
| 2006/0007108 A1 | 1/2006 | Utsumi et al. |
| 2006/0008205 A1 | 1/2006 | Meir et al. |
| 2006/0008225 A1* | 1/2006 | Naitou .................... G02B 6/12 385/129 |
| 2006/0024017 A1 | 2/2006 | Page et al. |
| 2006/0061008 A1 | 3/2006 | Karner et al. |
| 2006/0105149 A1 | 5/2006 | Donahue |
| 2006/0120106 A1 | 6/2006 | Kuki et al. |
| 2006/0120681 A1* | 6/2006 | Mune ................... G02B 6/1221 385/130 |
| 2006/0207134 A1 | 9/2006 | Harry |
| 2006/0215958 A1 | 9/2006 | Yeo et al. |
| 2006/0269213 A1 | 11/2006 | Hwang |
| 2007/0002578 A1 | 1/2007 | Furusawa et al. |
| 2007/0014110 A1 | 1/2007 | Itaya |
| 2007/0031097 A1 | 2/2007 | Heikenfeld et al. |
| 2007/0081360 A1 | 4/2007 | Bailey et al. |
| 2007/0086712 A1 | 4/2007 | Shani |
| 2007/0133935 A1 | 6/2007 | Fine |
| 2007/0147023 A1 | 6/2007 | Matsushita |
| 2007/0153545 A1 | 7/2007 | Lee |
| 2007/0171330 A1 | 7/2007 | Hung |
| 2007/0274091 A1 | 11/2007 | Inditsky |
| 2007/0279549 A1 | 12/2007 | Iwasaki |
| 2007/0280593 A1 | 12/2007 | Brychell et al. |
| 2007/0286562 A1 | 12/2007 | Inditsky |
| 2008/0007965 A1 | 1/2008 | Kanade et al. |
| 2008/0025039 A1 | 1/2008 | Guillermo |
| 2008/0031579 A1 | 2/2008 | Enami |
| 2008/0037284 A1 | 2/2008 | Rudisill |
| 2008/0043490 A1 | 2/2008 | Coleman et al. |
| 2008/0048366 A1 | 2/2008 | Durney |
| 2008/0075414 A1 | 3/2008 | Van Ostrand |
| 2008/0148753 A1 | 6/2008 | Welker et al. |
| 2008/0159693 A1 | 7/2008 | Chang |
| 2008/0266863 A1 | 10/2008 | Rinko |
| 2009/0028038 A1* | 1/2009 | Harada .................... B26D 3/10 369/173 |
| 2009/0059618 A1 | 3/2009 | Onikiri et al. |
| 2009/0172978 A1 | 7/2009 | Steenblik et al. |
| 2009/0173654 A1 | 7/2009 | Steenblik et al. |
| 2009/0207632 A1 | 8/2009 | McCollum et al. |
| 2009/0219734 A1 | 9/2009 | Sawada et al. |
| 2009/0257215 A1 | 10/2009 | Gomi |
| 2010/0014311 A1 | 1/2010 | Danieli |
| 2010/0040986 A1 | 2/2010 | Yamaguchi |
| 2010/0067254 A1 | 3/2010 | Ohta |
| 2010/0074585 A1* | 3/2010 | Shimizu ................ G02B 6/4224 385/129 |
| 2010/0092143 A1* | 4/2010 | Ushiwata .............. B29C 43/021 385/129 |
| 2010/0109173 A1* | 5/2010 | Yamamoto ........ B29D 11/00663 264/1.24 |
| 2010/0156953 A1 | 6/2010 | Nevitt |
| 2010/0214786 A1 | 8/2010 | Nichol |
| 2010/0258419 A1 | 10/2010 | Chung et al. |
| 2011/0032724 A1 | 2/2011 | Kinoshita |
| 2011/0085771 A1 | 4/2011 | Matsuyama et al. |
| 2011/0110638 A1* | 5/2011 | Shioda ................. G02B 6/1221 385/130 |
| 2011/0134623 A1 | 6/2011 | Sherman et al. |
| 2011/0176325 A1 | 7/2011 | Sherman et al. |
| 2011/0227487 A1 | 9/2011 | Nichol et al. |
| 2011/0255303 A1 | 10/2011 | Nichol et al. |
| 2011/0273901 A1 | 11/2011 | Nichol et al. |
| 2011/0273906 A1 | 11/2011 | Nichol et al. |
| 2011/0277361 A1 | 11/2011 | Nichol et al. |
| 2011/0283576 A1 | 11/2011 | Nichol |
| 2011/0286234 A1 | 11/2011 | Nichol |
| 2012/0287674 A1 | 11/2012 | Nichol et al. |
| 2013/0155723 A1 | 6/2013 | Coleman |
| 2013/0208508 A1 | 8/2013 | Nichol et al. |
| 2013/0250618 A1 | 9/2013 | Nichol et al. |
| 2013/0314942 A1 | 11/2013 | Nichol et al. |
| 2014/0049983 A1 | 2/2014 | Nichol et al. |
| 2014/0056028 A1 | 2/2014 | Nichol et al. |

(56) References Cited

U.S. PATENT DOCUMENTS

| | | | |
|---|---|---|---|
| 2014/0063853 | A1 | 3/2014 | Nichol et al. |
| 2014/0360578 | A1 | 12/2014 | Nichol et al. |
| 2015/0078035 | A1 | 3/2015 | Nichol et al. |
| 2015/0219834 | A1 | 8/2015 | Nichol et al. |
| 2015/0253487 | A1 | 9/2015 | Nichol et al. |

FOREIGN PATENT DOCUMENTS

| | | | |
|---|---|---|---|
| CN | 1985202 | | 6/2007 |
| CN | 200962289 | Y | 10/2007 |
| CN | 101140335 | A | 3/2008 |
| DE | 2736486 | A1 | 2/1978 |
| EP | 284098 | A1 | 9/1988 |
| EP | 1760502 | A1 | 3/2007 |
| EP | 2103972 | A1 | 9/2009 |
| GB | 198085 | | 5/1923 |
| GB | 662514 | | 12/1951 |
| JP | 61-278416 | A | 12/1987 |
| JP | 10-197865 | A | 7/1998 |
| JP | S63301909 | A | 12/1998 |
| JP | 11-264974 | A | 9/1999 |
| JP | 2000-056138 | A | 2/2000 |
| JP | 2000141997 | A | 5/2000 |
| JP | 2000147218 | A | 5/2000 |
| JP | 2000-258633 | | 9/2000 |
| JP | 2001243818 | | 9/2001 |
| JP | 2001266626 | A | 9/2001 |
| JP | 2001-312233 | A | 11/2001 |
| JP | 2002277661 | A * | 9/2002 |
| JP | 200469729 | A | 3/2004 |
| JP | 2004109426 | A * | 4/2004 |
| JP | 2004-170972 | A | 6/2004 |
| JP | 2004199967 | A | 7/2004 |
| JP | 2004-288570 | A | 10/2004 |
| JP | 2005043766 | A | 2/2005 |
| JP | 2005340160 | A | 8/2005 |
| JP | 2006-003431 | A | 1/2006 |
| JP | 2006-024561 | | 1/2006 |
| JP | 2006310112 | A | 11/2006 |
| JP | 2007053054 | A | 3/2007 |
| JP | 2008-198615 | A | 8/2008 |
| WO | 2004027314 | A1 | 4/2004 |
| WO | 2006131924 | A2 | 12/2006 |
| WO | 2007081862 | A2 | 7/2007 |
| WO | 2007123180 | A1 | 11/2007 |
| WO | 2007143383 | A2 | 12/2007 |
| WO | 2009048863 | A1 | 4/2009 |
| WO | 2009084176 | A1 | 7/2009 |
| WO | 2009084556 | A1 | 7/2009 |
| WO | 2010005655 | A2 | 1/2010 |
| WO | 2010085787 | A1 | 7/2010 |
| WO | 2011130715 | A2 | 10/2011 |
| WO | 2011130718 | A2 | 10/2011 |
| WO | 2011130720 | A2 | 10/2011 |
| WO | 2012016047 | A1 | 2/2012 |
| WO | 2012068543 | A1 | 5/2012 |
| WO | 2012088315 | A1 | 6/2012 |
| WO | 2012122511 | A1 | 9/2012 |
| WO | 2012158460 | A1 | 11/2012 |

OTHER PUBLICATIONS

Lee et al., "LED Light Coupler Design for a Ultra Thin Light Guide," Journal of the Optical Society of Korea, vol. 11, No. 3, Sep. 2007, pp. 113-117.
Chien et al., "The study of LED uniform lightguide for liquid crystal display backlight applications," Tatung University white paper, Taipei, Taiwan, 2008.
Siitonen et al., "Coupling of light from an LED into a thin light guide by diffractive gratings," Applied Optics, vol. 43, No. 30, Oct. 2004, 5631-5636.
Murata et al., "Input couplers for thin light-guides and light-emitting diodes," Optical Engineering 47(2), Feb. 2008, 027001-027007.
Kim, Joon-Sung, et al. "Stacked Polymeric Multimode Waveguide Arrays for Two-Dimensional Optical Interconnects", Journal of Lightwave Technology, p. 840, Mar. 2004.
Luminus Devices PhlatLight Data Sheet, PDS-001022 Rev 05, 2009.
International Search Report for International Application No. PCT/US08/79041, dated Jan. 8, 2009.
Cardinal Intellectual Property's search report (Work order 5874.5) including the results of a search for the features of the claims included in the U.S. patent application entitled "Light Coupling Into Films ", inventor: Anthony Nichol, and having assigned U.S. Appl. No. 13/206,210. The foregoing U.S. patent application is a continuation of U.S. Appl. No. 12/682,387.
Cardinal Intellectual Property's supplemental search report dated Nov. 7, 2011 (Work order 5874.6) including the results of a search for the features of the claims included in the U.S. patent application entitled "Method of Manufacturing a Light Emitting Device", inventor: Anthony Nichol, and having assigned U.S. Appl. No. 13/210,622. The foregoing U.S. patent application is a continuation of U.S. Appl. No. 12/682,387.
International Search Report for International Application No. PCT/US11/032797 dated Nov. 7, 2011.
Written Opinion of the International Searching Authority for International Application No. PCT/US11/032797 dated Nov. 7, 2011.
International Search Report for International Application No. PCT/US11/032795 dated Nov. 16, 2011.
Written Opinion of the International Searching Authority for International Application No. PCT/US11/032795 dated Nov. 16, 2011.
International Search Report for International Application No. PCT/US11/032792 dated Nov. 17, 2011.
Written Opinion of the International Searching Authority for International Application No. PCT/US11/032792 dated Nov. 17, 2011.
Written Opinion of the International Searching Authority for International Application No. PCT/US08/079041 dated Jan. 8, 2009.
International Search Report for International Application No. PCT/US10/22066 dated Mar. 22, 2010.
Written Opinion of the International Searching Authority for International Application No. PCT/US10/22066 dated Mar. 22, 2010.
International Search Report for International Application No. PCT/US11/045730 dated Dec. 23, 2011.
Written Opinion of the International Searching Authority for International Application No. PCT/US11/045730 dated Dec. 23, 2011.
International Search Report for International Application No. PCT/US11/61528 dated Mar. 26, 2012.
Written Opinion of the International Searching Authority for International Application No. PCT/US11/61528 dated Mar. 26, 2012.
International Search Report for International Application No. PCT/US11/066596 dated May 7, 2012.
Written Opinion of the International Searching Authority for International Application No. PCT/US11/066596 dated May 7, 2012.
Cardinal Intellectual Property's supplemental search report dated Nov. 7, 2011 (Work Order 5874.6) including the results of a search for the features of the claims included in the U.S. patent application entitled "Method of Manufacturing a Light Emitting Device," inventor: Anthony Nichol. The foregoing U.S. Patent application is a continuation of U.S. Appl. No. 12/682,387.
International Search Report for International Application No. PCT/US2012/028578 dated Jun. 28, 2012.
Written Opinion of the International Searching Authority for International Application No. PCT/US2012/028578 dated Jun. 28, 2012.
European Search Report and written opinion for European Application No. EP08838526 dated Sep. 19, 2012.
Office action dated Sep. 10, 2012 by the State Intellectual Property Office of China for application No. CN201080005385.0.
International Search Report for International Application No. PCT/US2012/37317 dated Aug. 22, 2012.
Written Opinion of the International Searching Authority for International Application No. PCT/US2012/37317 dated Aug. 22, 2012.
Office action dated Mar. 5, 2013 by the Japan Patent Office for application No. 2010-528972.

(56) References Cited

OTHER PUBLICATIONS

Office action dated May 15, 2012 by the USPTO for U.S. Appl. No. 12/682,387.
Office action dated Dec. 23, 2011 by the USPTO for U.S. Appl. No. 12/682,387.
Office action dated Jul. 23, 2012 by IP Australia for application No. 2010206525.
Office action dated Nov. 22, 2012 by Instituto Mexicano de la Propiedad Industrial for application MX/a/2011/007770.
Office action dated Dec. 6, 2012 by the USPTO for U.S. Appl. No. 13/088,231.
Notice of allowance dated Jan. 7, 2013 by the USPTO for U.S. Appl. No. 13/089,311.
Buchner, Diplomarbeit: Kinetmatics of 3D Folded Structures for Nanostructured Origami, Department of Mechanical Engineering, 3D optical Systems Group, Massachusetts Institute of Technology, 2003.
Nichol, A.J.; Barbastathis, G., "Sub-30nm alignment accuracy between layered photonic nanostructures using optimized V nanomagnet arrays," Optical MEMs and Nanophotonics, 2008 IEEE/LEOS Internationall Conference on , vol., No., pp. 9,10, Aug. 11-14, 2008.
Arora et al., "Membrane folding to achieve three-dimensional nanostructures: Nanopatterned silicon nitride folded with stressed chromium hinges," Appl. Phys. Lett. 88, 053108 (Jan. 2006).
"Nanostructured Origami Folding of Patternable Resist for 3D Lithography" "Se Young Yang, Hyung-ryul Johnny Choi, Martin Deterre, George Barbastathis," "IEEE 2010 International Conference on Optical MEMS & Nanophotonics, p. 37-38, Aug. 2010".
Notice of allowance dated Jul. 29, 2013 by the China Patent Office for application No. 201080005385.0.
Office action dated Jun. 20, 2013 by Instituto Mexicano de la Propiedad Industrial for application MX/a/2012/012033.
Office action dated Jun. 26, 2013 by Instituto Mexicano de la Propiedad Industrial for application MX/a/2012/012034.
Office action dated Jun. 26, 2013 by Instituto Mexicano de la Propiedad Industrial for application MX/a/2012/012035.
Office action dated Oct. 15, 2013 by the China Patent Office for application No. 201180027439.8.
Office action dated Nov. 19, 2013 by the China Patent Office for application No. 201180027447.2.
Office action dated Dec. 3, 2013 by Japan Patent Office for application No. 2010-528972.

\* cited by examiner

FIG. 6

METHODS OF FORMING FILM-BASED LIGHTGUIDES

CROSS REFERENCE TO RELATED APPLICATION

This application claims the benefit of U.S. Provisional Application No. 61/777,525 entitled "Methods of Forming Film-Based Lightguides and Displays including the Same," filed on Mar. 12, 2013, which is incorporated by reference herein in its entirety.

TECHNICAL FIELD

The subject matter disclosed herein generally relates to lightguides, films, and light emitting devices such as, without limitation, light fixtures, backlights, frontlights, light emitting signs, passive displays, and active displays and their components and methods of manufacture.

BACKGROUND

Conventionally, in order to reduce the thickness of displays and backlights, edge-lit configurations using rigid lightguides have been used to receive light from the edge of and direct light out of a larger area surface. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide.

SUMMARY

In one aspect, a method of manufacturing a lightguide includes cutting into a first region of a film using a first cutting process with a first cutting device to form a plurality of slits in the film defining lateral edges for each of a plurality of coupling lightguides extending from a body of a film, and cutting in a second region of the film different than the first region using a second cutting process different than the first cutting process with a second cutting device.

In another aspect, a method of manufacturing a film-based lightguide includes cutting a film using a first cutting device in a first region the film, and cutting the film using a second cutting device different than the first cutting device in a second region of the film different than the first region of the film, to create an array of coupling lightguides extending from a body of the film.

In yet another aspect, a method of forming a plurality of coupling lightguides in a film includes cutting a first region of the film using at least one first cutting device to form a plurality of edges of the film defining a plurality of openings. One or more knives are inserted into the plurality of openings, and translated relative to the film or the film translated relative to the one or more knives to cut a plurality of coupling lightguides extending from a body of the film in a second region different than the first region.

DETAILED DESCRIPTION

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

DEFINITIONS

"Electroluminescent displays" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent displays can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of n≈1; however, high and low refractive index materials can be used to achieve lightguide regions. A lightguide does not need to be optically coupled to all of its components to be considered as a lightguide. Light may enter from any face (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5 micron region or layer of a film or it may be a 3 millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired.

A "film" as used herein refers to a thin extended region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

Various light emitting devices, components or layers of light emitting devices, displays, electroluminescent displays, their methods of manufacture, and their configurations can be used with embodiments disclosed herein and include those disclosed in U.S. patent application Ser. No. 13/088,167, which is incorporated by reference herein in its entirety.

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one face or edge of the core material with a refractive index less than a refractive index of the core material. In other embodiment, the light input coupler includes a plurality of coupling lightguides wherein a portion of light from a light source incident on a face of at least one strip is directed into the lightguide such that light travels in a waveguide condition. The light input coupler may also include one or more of the following: a strip folding device, a strip holding element, and an input surface optical element.

In one embodiment, a first array of light input couplers are positioned to input light into the light mixing region, light emitting region, or lightguide region and the separation distance between the light input couplers varies. In one embodiment, a light emitting device includes at least three light input couplers disposed along a side of a film wherein the separation between a first pair of input couplers along the side is greater than the separation distance between a second pair of input couplers along the side.

Light Source

In one embodiment, a light emitting device includes at least one light source including one or more of the following: a fluorescent lamp, a cylindrical cold-cathode fluorescent lamp, a flat fluorescent lamp, a light emitting diode, an organic light emitting diode, a field emissive lamp, a gas discharge lamp, a neon lamp, a filament lamp, incandescent lamp, an electroluminescent lamp, a radiofluorescent lamp, a halogen lamp, an incandescent lamp, a mercury vapor lamp, a sodium vapor lamp, a high pressure sodium lamp, a metal halide lamp, a tungsten lamp, a carbon arc lamp, an electroluminescent lamp, a laser, a photonic bandgap based light source, a quantum dot based light source, a high efficiency plasma light source, and a microplasma lamp. The light emitting device may include a plurality of light sources arranged in an array, on opposite sides of a lightguide, on orthogonal sides of a lightguide, on 3 or more sides of a lightguide, or on 4 sides of a substantially planer lightguide. The array of light sources may be a linear array of discrete LED packages including at least one LED die.

Led Array

In one embodiment, the light emitting device includes a plurality of LEDs or LED packages wherein the plurality of LEDs or LED packages includes an array of LEDs. In another embodiment, the input array of LEDs can be arranged to compensate for uneven absorption of light through longer verses shorter lightguides. In another embodiment, the absorption is compensated for by directing more light into the light input coupler corresponding to the longer coupling lightguides or longer lightguides.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Stacked Strips or Segments of Film Forming a Light Input Coupler

In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermoformed optical lens, and a cross-linked lens made from a mold. In another embodiment, the light collimating element reduces the angular full-width at half maximum (FWHM) intensity within the input plane and a plane orthogonal to the input plane.

Coupling Lightguide

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling lightguides) of a planar film has dimensions of a rectangle that is 3 millimeters by 2.7 millimeters and the light input coupler couples light into a planar section of a film in the light mixing region with a cross-sectional dimensions of 40.5 millimeters by 0.2 millimeters. In one embodiment, the extended direction of one or more coupling lightguides is the direction in which the one or more coupling lightguides extend from a common base area.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that a longest dimension in a cross-section through the light emitting device or coupling lightguide in at least one plane is less than without the fold or bend. Segments or strips may be bent or folded in more than one direction or region and the directions of folding or bending may be different between strips or segments.

Staggered Input Surfaces

In one embodiment, the coupling lightguides: have the same width; are oriented parallel to each other; begin to fold along a line perpendicular to the extended direction of the coupling lightguides at the lightguide region; and are parallel to the lightguide region from which they extend in the stacked region. In this embodiment, the different radii of curvature can cause the ends of the coupling lightguides at the light input surface to be laterally translated (such that they extend laterally past each other) in the extended direction by a translation distance $D_n$ component in the plane of the film before the fold from the fold line in the case of 90 degree folds. In this embodiment, the fold line is the line perpendicular to the extended direction of the coupling lightguides for a 90 degree fold along which the coupling lightguides begin to fold. The translated distance $D_n$ in the extended direction for the $n^{th}$ coupling lightguide is related to the radius of curvature of the $n^{th}$ coupling lightguide by the formula:

$$D_n = \frac{\sqrt{2}}{2} \times \pi \times R_n.$$

For example, in one embodiment, the smallest radius of curvature is 5 times the thickness of the film. For a light input coupler with a stack of 10 coupling lightguides, the difference in translated distance between the $10^{th}$ coupling lightguide and the first coupling lightguide is:

$$D_{10} - D_1 = \frac{\sqrt{2}}{2} \times \pi \times (R_{10} - R_1) = \frac{\sqrt{2}}{2} \times \pi \times \left(\frac{9}{2}\right)t \approx 10 \times t.$$

For systems where the width of the coupling lightguide is much larger than the thickness of each coupling lightguide (for example, the width divided by the thickness is greater than 20), the number of coupling lightguides is small (for example, less than 5), and the lateral width of the light reaching the light input surface is small relative to the width of the coupling lightguides (for example, the width of the input surface divided by the lateral light width is greater than 3), then the lateral translated difference may be negligible (assuming a suitable mechanism is used to position and hold the coupling lightguides in place under the proper tension). Similarly, for systems where the width of the coupling lightguide is comparable to the thickness of each coupling lightguide (for example, the width divided by the thickness is less than 5), the number of coupling lightguides is large (for example, greater than 10), and the lateral width of the light reaching the light input surface is comparable to the width of the coupling lightguides (for example, the width of the input surface divided by the lateral light width is less than 3), then the lateral translated difference may be important and one or more compensation features may be needed to compensate for the large difference in radii of curvature.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, $n_m$, of the surface to which it is optically coupled. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide and the cladding material is not disposed on one or more coupling lightguides.

Lightguide Configuration and Properties

In one embodiment, the thickness of the film, lightguide and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, a greater than 90% of the entire thickness of the film, a lightguide, and a lightguide region is less than 0.2 millimeters.

Multilayer Lightguide

In one embodiment, the lightguide includes at least two layers or coatings. In another embodiment, the layers or coatings function as at least one selected from the group: a core layer, a cladding layer, a tie layer (to promote adhesion between two other layers), a layer to increase flexural strength, a layer to increase the impact strength (such as Izod, Charpy, Gardner, for example), and a carrier layer. In a further embodiment, at least one layer or coating includes a microstructure, surface relief pattern, light extraction features, lenses, or other non-flat surface features which redirect a portion of incident light from within the lightguide to an angle whereupon it escapes the lightguide in the region near the feature. For example, the carrier film may be a silicone film with embossed light extraction features disposed to receive a thermoset polycarbonate resin core region including a thermoset material In one embodiment, a thermoset material is coated onto a thermoplastic film wherein the thermoset material is the core material and the cladding material is the thermoplastic film or material. In another embodiment, a first thermoset material is coated onto a film including a second thermoset material wherein the first thermoset material is the core material and the cladding material is the second thermoset plastic.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices comprised of smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching.

Lightguide Folding Around Components

In one embodiment, at least one selected from the group: lightguide, lightguide region, light mixing region, plurality of lightguides, coupling lightguides, and light input coupler bends or folds such that the component other components of the light emitting device are hidden from view, located behind another component or the light emitting region, or are partially or fully enclosed. These components around which they may bend or fold include components of the light emitting device such as light source, electronics, driver, circuit board, thermal transfer element, spatial light modulator, display, housing, holder, or other components such that the components are disposed behind the folded or bent lightguide or other region or component.

Light Absorbing Region or Layer

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Adhesion Properties of the Lightguide, Film, Cladding or Other Layer

In one embodiment, one or more of the lightguide, the core material, the light transmitting film, the cladding material, and a layer disposed in contact with a layer of the film has adhesive properties or includes a material with one or more of the following: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film) or an element external to the light emitting device such as a window, wall, or ceiling.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display.

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodiment, the input surfaces of the coupling lightguides are arranged to create a collective light input surface by translation of the coupling lightguides to create at least one bend or fold.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides. The relative position maintaining element may be adhered, clamped, disposed in contact, disposed against a linear fold region or disposed between a linear fold region and a lightguide region. The relative position maintaining element may be a polymer or metal component that is adhered or held against the surface of the coupling lightguides, light mixing region, lightguide region or film at least during one of the translational steps. In one embodiment, the relative position maintaining element is a polymeric strip with planar or saw-tooth-like teeth adhered to either side of the film near the first linear fold region, second linear fold region, or both first and second linear fold regions of the coupling lightguides. By using saw-tooth-like teeth, the teeth can promote or facilitate the bends by providing angled guides. In another embodiment, the relative position maintaining element is a mechanical device with a first clamp and a second clamp that holds the coupling lightguides in relative position in a direction parallel to the clamps parallel to the first linear fold region and translates the position of the clamps relative to each other such that the first linear fold region and the second linear fold region are translated with respect to each other to create overlapping coupling lightguides and bends in the coupling lightguides. In another embodiment, the relative position maintaining element maintains the relative position of the coupling lightguides in the first linear fold region, second linear fold region, or both the first and second linear fold regions and provides a mechanism to exert force upon the end of the coupling lightguides to translate them in at least one direction.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region. In another embodiment, tie layers, adhesion promotion layers, materials or surface modifications are disposed on a surface of or between the cladding layer and the lightguide layer. In one embodiment, the coupling lightguides, or core regions thereof, are continuous with the lightguide region of the film as formed during the film formation process. For example, coupling lightguides formed by slicing regions of a film at spaced intervals can form coupling lightguides that are continuous with the lightguide region of the film. In another embodiment, a film-based lightguide with coupling lightguides continuous with the lightguide region can be formed by injection molding or casting a material in a mold including a lightguide region with coupling lightguide regions with separations between the coupling lightguides. In one embodiment, the region between the coupling lightguides and lightguide region is homogeneous and without interfacial transitions such as without limitation, air gaps, minor variations in refractive index, discontinuities in shapes or input-output areas, and minor variations in the molecular weight or material compositions.

In another embodiment, at least one selected from the group: lightguide layer, light transmitting film, cladding region, adhesive region, adhesion promotion region, or scratch resistant layer is coated onto one or more surfaces of the film or lightguide. In another embodiment, the lightguide or cladding region is coated onto, extruded onto or otherwise disposed onto a carrier film. In one embodiment, the carrier film permits at least one selected from the group: easy handling, fewer static problems, the ability to use traditional paper or packaging folding equipment, surface protection (scratches, dust, creases, etc.), assisting in obtaining flat edges of the lightguide during the cutting operation, UV absorption, transportation protection, and the use of winding and film equipment with a wider range of tension and flatness or alignment adjustments. In one embodiment, the carrier film is removed before coating the film, before bending the coupling lightguide, after folding the coupling lightguides, before adding light extraction features, after adding light extraction features, before printing, after printing, before or after converting processes (further lamination, bonding, die cutting, hole punching, packaging, etc.), just before installation, after installation (when the carrier film is the outer surface), and during the removal process of the lightguide from installation. In one embodiment, one or more additional layers are laminated in segments or regions to the core region (or layers coupled to the core region) such that there are regions of the film without the one or more additional layers. For example, in one embodiment, an optical adhesive functioning as a cladding layer is optically coupled to a touchscreen substrate; and an optical adhesive is used to optically couple the touchscreen substrate to the light emitting region of film-based lightguide, thus leaving the coupling lightguides without a cladding layer for increased input coupling efficiency. In another embodiment, the carrier film is slit or removed across a region of the coupling lightguides. In this embodiment, the coupling lightguides can be bent or folded to a smaller radius of curvature after the carrier film is removed from the linear fold region.

Folding and Assembly

In one embodiment, the coupling lightguides are heated to soften the lightguides during the folding or bending step. In another embodiment, the coupling lightguides are folded while they are at a temperature above one selected from the group: 50 degrees Celsius, 70 degrees Celsius, 100 degrees Celsius, 150 degrees Celsius, 200 degrees Celsius, and 250 degrees Celsius.

Folder

In one embodiment, the coupling lightguides are folded or bent using opposing folding mechanisms. In another embodiment, grooves, guides, pins, or other counterparts facilitate the bringing together opposing folding mechanisms such that the folds or bends in the coupling lightguides are correctly folded. In another embodiment, registration guides, grooves, pins or other counterparts are disposed on the folder to hold in place or guide one or more coupling lightguides or the lightguide during the folding step.

Two-Step Cutting Process

In one embodiment, the shape of film-based lightguide including an array of coupling lightguides is formed by two cutting steps. In one embodiment, one of the cutting steps is a low surface finish step and the other step is a high surface finish cutting step. In one embodiment, the high surface finish cutting step is an optical quality surface finish. In one embodiment, one cutting step cuts the film using a blade or sharp object impacting the large area surface of the film and another step cuts the film by translating a blade or sharp object in a direction substantially parallel to the large area surface of the film or translating the film across a blade or sharp object in a direction substantially parallel to the large area surface of the film. For example in one embodiment, a first cutting step includes die cutting and a second step includes cutting the film starting with a blade through the film in a direction parallel to the large area surface. In one embodiment, the angle of the blade edge relative to the large area surface of the film is one selected from the group: 0 degrees, 90 degrees, and less than 90 degrees and greater than 0 degrees. In one embodiment, the film-based lightguide is cut by a stamping process to efficiently create channels through which to insert blades to cut the film in a direction parallel to the large area surface by translating the film or the blades in a direction parallel to the large area surface. In one embodiment, the coupling lightguides are cut parallel to the channels created by the stamping process. In one embodiment, the film is cut by a cutting step that begins at a lateral edge of the film. In another embodiment, by creating starting channels for the cuts, the optical quality of the coupling lightguide edges or lateral edge cuts in the film-based lightguide is increased since the blades do not need to punch through the film (which can introduce tearing, stress, wrinkling, etc.). In one embodiment, the blades and/or lightguide is heated to a temperature above 30 degrees Celsius prior to cutting. In one embodiment, one or more of the lateral edges of the film, guides, internal light redirecting edges, perforations, holes, cavities, light mixing region, lightguide, light emitting region, or coupling lightguides is cut by a cutting process by a cutting device such as one or more selected from the group: knife, blade, die, scissors, sharp object, water jet, and laser (such as, for example, a CO2 laser, excimer laser, gas laser, femtosecond laser, diode laser, frequency doubled laser, or fiber laser). In another embodiment, a cutting step (such as, for example, a die cutting or stamping step through the large area surface or a blade cutting step at an edge of the film in the direction parallel to the large area surface) forms channels, guide holes or cavities, perforations, a light input surface, internal light redirecting edges, or lateral edges of the film-based lightguide.

In one embodiment, at least one roller in a cutting system for a film-based lightguide includes a plurality of blades. In another embodiment, the roller includes an array of blades that cut a film passing between the first roller and a second roller. In one embodiment, the second roller is compressible (such as a rubber roller) or includes cavities through which the blades from the first roller may pass. In another embodiment, the first roller includes at least one blade extending around less than the circumference of the first roller. In another embodiment, the first roller includes at least one round blade substantially extending around the circumference of the first roller.

In one embodiment, the method of manufacturing the film-based lightguide includes a cutting step that creates at least one more channel along a side of the film based lightguide including an array of coupling lightguides than the number of coupling lightguides in the array. In another embodiment one or more cutting steps creates one or more sacrificial coupling lightguides. In this embodiment, the first cutting step can create channels whereupon subsequent cutting to create higher quality surface finishes creates two outer sacrificial coupling lightguides that can be removed from the film after a subsequent process. In another embodiment, cutting the lateral edges of the of the film-based lightguide corresponding with the light emitting region of the film-based lightguide and/or the outer lateral edges of the outer coupling lightguides is performed by the same cutting step (which could be one blade on each side of the film, for example) or by a first or second cutting step. In one embodiment, the blades cutting the outer lateral edges of the outer coupling lightguides are different than the blades cutting the lateral edges of the lightguide region. In this embodiment, the blades cutting the outer lateral edges of the lightguide region may be positioned to cut within a first volume region of the film defined by the outer lateral edges of the outer coupling lightguides extended in the extended direction or to cut the outer lateral edges outside of the first volume region of the film.

In one embodiment, the method of manufacturing the coupling lightguides for a film-based lightguide includes constraining and/or applying tension in at least the extended direction to the region of film that will include the array of coupling lightguides before, after, or during cutting. In one embodiment, the location of the region of the film to be cut to form an optical edge (such as a lateral edge of one or more coupling lightguides or a lateral edge of the film-based lightguide with an optical quality finish) is constrained in one or more of the x, y, and z directions. For example, in one embodiment a pair of rollers constrain the film in the transverse direction and thickness direction (where the machine direction is the direction of movement of the film passing between the rollers analogous to polymer film production) while one or more edges are cut. In another embodiment, the cutting device includes a blade angled relative to the large area surface of the film wherein as the film is moved across the blade (or the blade is moved across the film), the angled blade contacts the upper large area surface of the film before the lower large area surface of the film and constrains the film in the direction orthogonal to the film surface toward the upper large area surface of the film. In this embodiment, the blade can be considered to be leaning toward the film region to be cut and reference to "upper" and "lower" can refer to either large area surface of the film depending on the orientation of the film and blade.

Surface Quality of the Lateral Edges of the Coupling Lightguides

In one embodiment, the method of forming the lateral edges of one or more coupling lightguides generates an optically smooth edge surface finish with at least one of the following properties: an arithmetic mean roughness parameter, Ra (DIN 4768 standard method), of 50 nanometers or less; a scratch-dig less than 80 units, and a flatness value (peak to valley) less than 50 nanometers.

In one embodiment, the optical quality surface finish of the lateral edges of one or more coupling lightguides is a surface with one or more of the following surface properties: an arithmetic mean roughness parameter, Ra (DIN 4768 standard method), less than 500, 200, 100, or 50 nanometers; a flatness value (peak to valley) less than 500, 200, 100, or 50 nanometers; an RMS slope of the profile within the sampling length, R$\Delta$q, less than 1, 0.8, 0.6, 0.4, 0.2, 0.1, and 0.005 milliradians; and an ASTM D523-08 gloss at 20 degrees greater than 80, 90, 100, 110, 120, and 130 gloss units.

Cutting Coupling Lightguides after Lamination

In one embodiment, one or more coupling lightguides are cut subsequent to laminating, adhering, or physically coupling the film-based lightguide to the display. In this embodiment, the strips may overhang or extend beyond one or more display edges. In this embodiment, for example, the coupling lightguides could be cut (using one or two cutting/stamping steps or processes) according to the position of the display as opposed to requiring alignment during lamination of a pre-cut film to the display. In this embodiment, the major alignment/positioning tolerance requirement can be transferred to the cutting step subsequent to lamination. In another embodiment, cutting the film-based lightguide to form the coupling lightguides after lamination avoids stretching or lamination alignment issues due to pressure, tension, stress, temperature, humidity, web width variations, alignment guides or edge variations.

Quality Control

In one embodiment, the position of the light source (such as an LED) or the light source and an optical element is automatically or manual adjusted to measure the optical properties exiting the light emitting region or the active area of the display. In one embodiment, the position is adjusted to maximize the uniformity (spatial intensity, spatial luminance, spatial color, etc.), to maximize the light output (measured using an integrating sphere, for example), or to provide registration of light sources with different spectral qualities with different light input couplers or collections of coupling lightguide input surfaces from one or more stacks of coupling lightguides or one or more film-based lightguides. In one embodiment, the position of the light source (with or without the an optical element between the light source and the light input surface) in the x, y, or z direction is automatically adjusted during manufacturing or assembly by measuring the light output from the light emitting region (or active area of the display), or sub-region thereof, as one or more light sources are turned on in sequence or at the same time. In this embodiment, the position of the light source (and optical element if present) may be fixed or locked into place by a UV cured or other adhesive, for example. In one embodiment, the optical properties of the light emitting device (such as an LED based frontlight including a film-based lightguide) are tested prior to assembly onto a display (such as a reflective display). In one embodiment, the optical characteristics of the reflective display are simulated during the measurement of the light emitting film-based lightguide by matching the diffuse reflectance and/or angular properties of the light reflected from the display using a test surface (such as a gray reflective film or using a display driven white where the lightguide is not laminated to the display, for example). In this embodiment, a light source may be positioned to couple light into at least one light input surface of at least one stack of coupling lightguides and the test surface or test display can simulate the angular and/or reflectance properties of the display to which the film-based lightguide will be laminated. In another embodiment one or more cameras such as imaging photometers can be used to capture images and scan the images for blemishes or non-uniformities within the light emitting region of the film based lightguide (or the active area of the display) when a light source of a first color is positioned to couple light into at least one light input surface of at least one stack of coupling lightguides. In another embodiment, different light sources are turned on at different times to measure the optical properties of the light exiting the light emitting surface (or the active area of a display) under illumination by light sources with different spectral properties (such as red, green, and blue LEDs). In another embodiment, the ratio of the light flux from the one or more test light sources to the maximum light flux under normal operation of the one or more light sources in the light emitting device is one or more selected from the group: 1, greater than 1, greater than 2, greater than 3, greater than 4, greater than 5, greater than 10, and greater than 20. In one embodiment, the optical testing is performed while the film-based lightguide or the display including the film based lightguide is on a flexible web in a roll-to-roll based manufacturing process and the light source may be pulse driven.

Reflective Display

In one embodiment, a method of producing an electroluminescent display includes: forming an array of coupling lightguides from a lightguide region of a film including a core region and a cladding region by separating the coupling lightguides from each other such that they remain continuous with the lightguide region of the film and comprise bounding edges at the end of the coupling lightguides; folding the plurality of coupling lightguides such that the bounding edges are stacked; directing light from a light source into the stacked bounding edges such that light from the light source propagates within the core region through the coupling lightguides and lightguide region of the film by total internal reflection; forming light extraction features on or within the core layer in a light emitting region of the lightguide region of the film; disposing a light extracting region on the cladding region or optically coupling a light extracting region to the cladding region in a light mixing region of the lightguide region between the coupling lightguides and the light emitting region; and disposing the light emitting region adjacent a reflective spatial light modulator.

The following are more detailed descriptions of various embodiments illustrated in the Figures.

Figure 1:
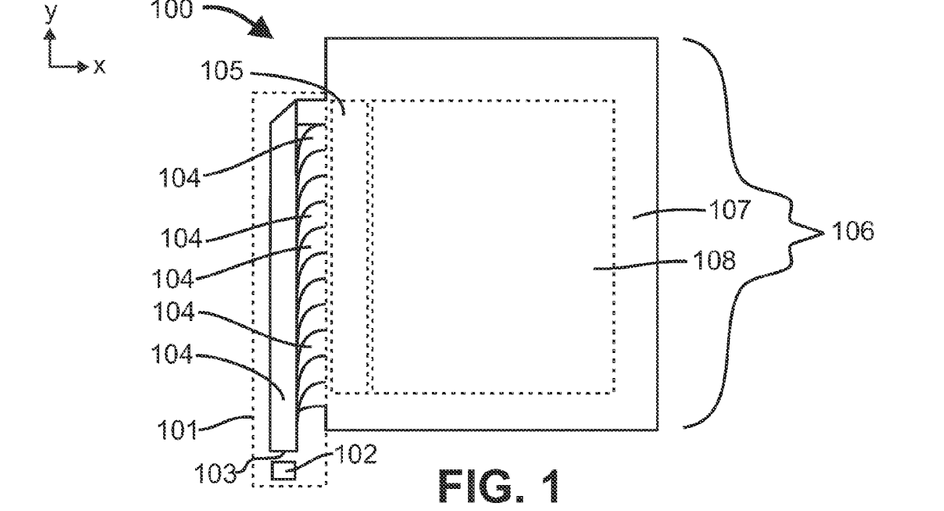
FIG. 1 is a top view of one embodiment of a light emitting device including a light input coupler disposed on one side of a lightguide.

FIG. 1 is a top view of one embodiment of a light emitting device 100 including a light input coupler 101 disposed on one side of a film-based lightguide. The light input coupler 101 includes one or more coupling lightguides 104 and a light source 102 disposed to direct light into the coupling lightguides 104 through a light input surface 103 including one or more input edges of the coupling lightguides 104. In one embodiment, each coupling lightguide 104 terminates at a bounding edge. Each coupling lightguide is folded such that the bounding edges of the coupling lightguides are stacked to form the light input surface 103. The light emitting device 100 further includes a lightguide region 106 defining a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the lightguide 107. In one embodiment, light is emitted from the lightguide 107 in the light emitting region 108 due to light extraction features (not shown).

Figure 2:
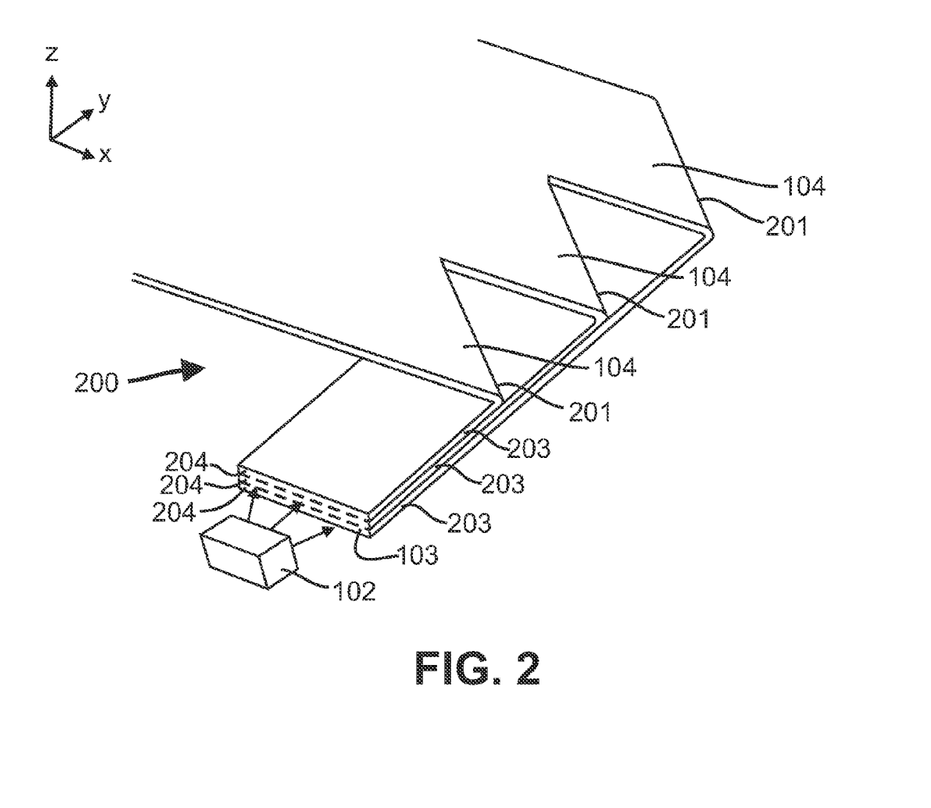
FIG. 2 is a perspective view of one embodiment of a light input coupler with coupling lightguides folded in a −y direction.

FIG. 2 is a perspective view of one embodiment of a light input coupler 200 with coupling lightguides 104 folded in a −y direction. Light from the light source 102 is directed into the light input surface 103 through or along input edges 204 of the coupling lightguides 104. A portion of the light from the light source 102 propagating within the coupling lightguides 104 with a directional component in a +y direction will reflect in a +x direction and a −x direction from the lateral edges 203 of the coupling lightguides 104 and will reflect in a +z direction and a −z direction from the top and bottom surfaces of the coupling lightguides 104. The light propagating within the coupling lightguides is redirected by the folds 201 in the coupling lightguides 104 toward the −x direction.

Figure 3:
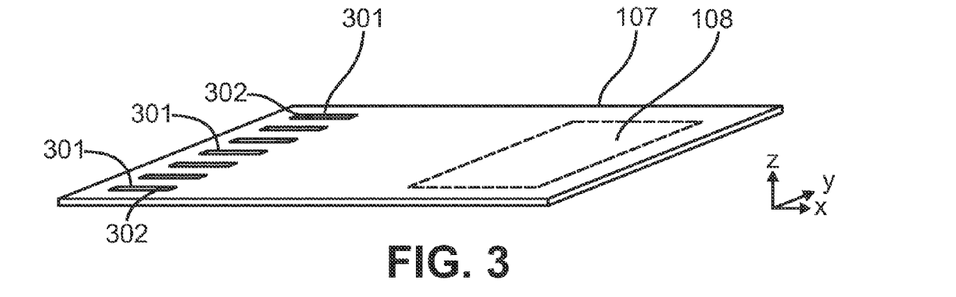
FIG. 3 is a perspective view of first cut regions formed in a film-based lightguide including a light emitting region in a first cutting step.
Figure 4:
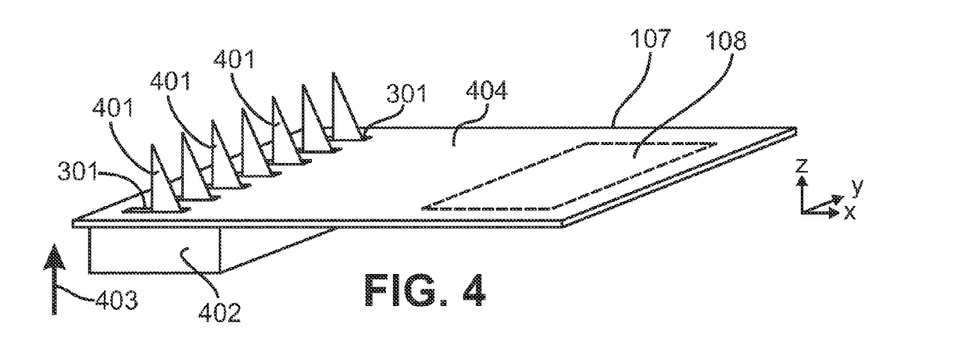
FIG. 4 is a perspective view of knife blades supported by a common base and positioned for a second cutting operation.
Figure 5:
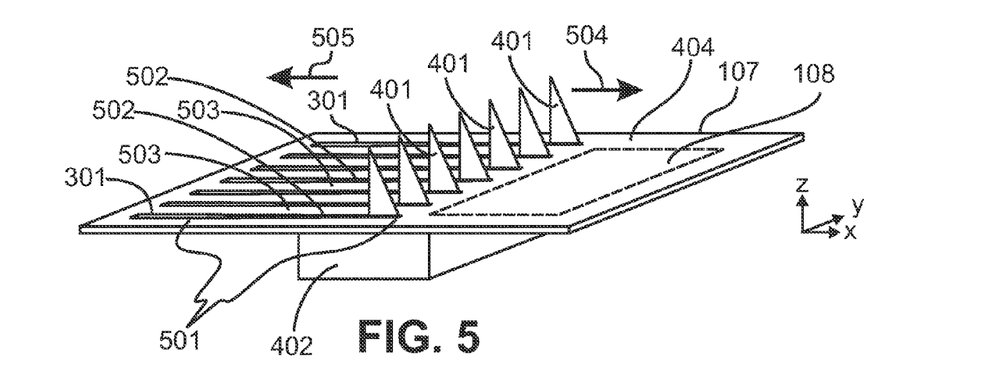
FIG. 5 is a perspective view of second cut regions formed in the film-based lightguide in a second cut region.
Figure 6:
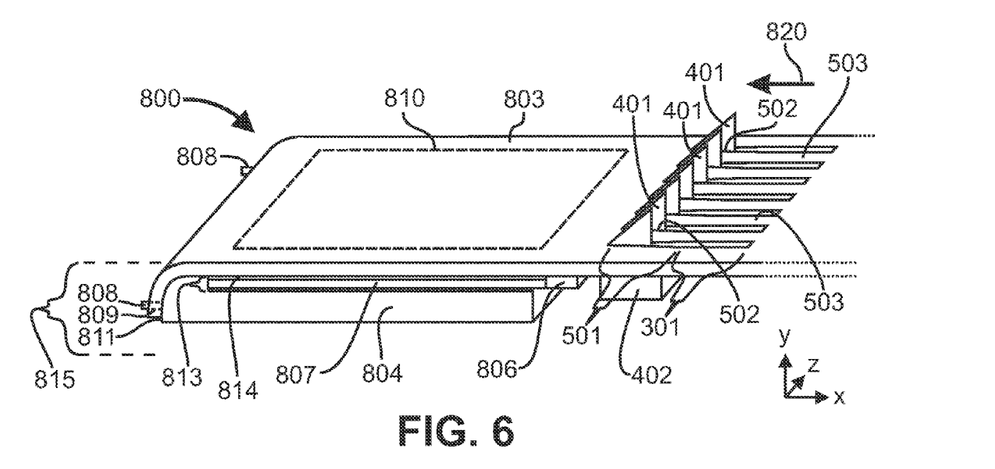
FIG. 6 is a perspective view of one embodiment of a light emitting display including a flexible film-based lightguide with a plurality of coupling lightguides having lateral edges formed subsequent to laminating a display to the flexible film-based lightguide.

FIGS. 3-5 are perspective views illustrating one embodiment of a method for manufacturing a film-based lightguide 107 including coupling lightguides 503, shown in FIGS. 5 and 6.

FIG. 3 is a perspective view of a plurality of first cut regions 301 formed in a film-based lightguide 107 including a light emitting region 108 in a cutting step or process, such as a first cutting step or process. In one embodiment, surfaces 302 of the first cut regions 301 have a low surface finish (high surface roughness, for example) and are formed, for example, by die cutting the film-based lightguide 107 to form the first cut regions 301, such as slits, cuts, or channels.

FIG. 4 is a perspective view of a plurality of knife blades supported by a common base 402 and positioned for a second cutting step or process. The knife blades 401 are operatively coupled to the base 402 and the knife blades 401 are translated in a first direction 403 (parallel to the +z direction as shown in FIG. 4) perpendicular to the film-based lightguide surface 404 through the first cut regions 301 formed previously.

FIG. 5 is a perspective view of a plurality of second cut regions 501, such as slits or cuts, formed in the film-based lightguide 107 to form lateral edges 502 of each of a plurality of coupling lightguides 503 of the film-based lightguide 107. In one embodiment, the lateral edges 502 are formed by translating the knife blades 401 operatively coupled to the base 402 in a second cut region 501 through the film-based lightguide 107 in a cutting direction 504 (parallel to the +x direction) parallel to the surface 404 of the film-based lightguide 107. The knife blades 401 cut the film-based lightguide 107 to form an optical quality surface finish on the lateral edges 502 of the coupling lightguides 503 in the second cut region 501. In one embodiment, the film-based lightguide 107 is held under tension in the extended direction 505 (parallel to the -x direction) of the coupling lightguides 503, such as by holding the film-based lightguide 107 between rollers (not shown) in one or more regions at or near the opposing ends in the x direction of the film, while the knife blades 401 are translated in the cutting direction 504 in the second cut region 501 to form edges or define the lateral edges 502 of the coupling lightguides 503. Similarly, the film-based lightguide 107 shown in FIG. 5 may be translated across the knife blades 401 to form edges in the film-based lightguide 107 that define the lateral edges 502 of the coupling lightguides 503

FIG. 6 is a perspective view of a light emitting display 800 illustrating one embodiment of a method of manufacturing the light emitting display 800. In one embodiment, the lateral edges 502 of coupling lightguides 503 are formed subsequent to laminating a display 807 to a flexible film-based lightguide 803. In this embodiment, a carrier tray 804 is used to position the display 807 at least partially within a cavity 813 of the carrier tray 804. The carrier tray 804 includes one or more alignment pins, such as two alignment pins 808, extending from a first side 811 of the carrier tray 804. In this embodiment, the display 807 includes a display connector 806 (such as a flexible display driver electrical connector) operatively coupled to the display 807 that extends past the carrier tray 804 in the +x direction as shown in FIG. 8. The flexible film-based lightguide 803 includes alignment holes 809. During assembly, the flexible film-based lightguide 803 is positioned above the display 807 such that a light emitting area 810 of the flexible film-based lightguide 803 is positioned above the display 807 and the alignment holes 809 are positioned over the two alignment pins 808 of the carrier tray 804. The lamination stack 815 includes the carrier tray 804, the display 807, the film-based lightguide 803, and a pressure sensitive adhesive 814. The lamination stack 815 is fed between two lamination rollers (not shown) such that the film-based lightguide 803 is laminated to the display 807 using the pressure sensitive adhesive 814 positioned between the flexible film-based lightguide 803 and the display 807. The flexible film-based lightguide 803 is held under tension further in the +x direction from the carrier tray 804, such as by using rollers (not shown). The lateral edges 502 of the coupling light-guides 503 are formed by inserting knife blades 401 operatively coupled to the base 402 into the first cut regions 301 and translating the knife blades 401 in a cutting direction 820 (parallel to the -x direction) to form an optical quality surface finish on the lateral edges 502 of the coupling lightguides 503 in the second cut region 501.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

While the disclosure includes various specific embodiments, those skilled in the art will recognize that the embodiments can be practiced with modification within the spirit and scope of the disclosure and the claims.

EQUIVALENTS

Those skilled in the art will recognize, or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius.

What is claimed is:

1. A method of manufacturing a lightguide, the method comprising:
    cutting into a first region of a film using a first cutting process with a first cutting device to form a plurality of slits in the film defining light reflecting lateral edge surfaces for each of a plurality of coupling lightguides extending from a body of a film; and
    cutting in a second region of the film different than the first region using a second cutting process different than the first cutting process with a second cutting device different from the first cutting device,
    wherein the first cutting process forms the lateral edges with a higher quality surface finish sufficient for optical propagation of light by reflection from the lateral edge surfaces in the first region measured by an arithmetic mean roughness parameter of the lateral edge surfaces lower than an arithmetic mean roughness parameter of edge surfaces of the film formed by the second cutting process in the second region with a lower quality surface finish.

2. The method of claim 1 further comprising applying tension to the film in a cutting direction during the first cutting process to form the plurality of coupling lightguides extending in the cutting direction.

3. The method of claim 1 wherein the second cutting process occurs before the first cutting process.

4. The method of claim 1 wherein the arithmetic mean roughness parameter of the lateral edge surfaces is less than 500 nanometers.

5. The method of claim 3 wherein the second cutting device is a die.

6. The method of claim 5 wherein the second cutting process comprises die cutting the film through a large area surface of the film.

7. The method of claim 3 wherein the second cutting process forms a plurality of channels, the first cutting device comprises one or more knives, and the first cutting process comprises inserting the one or more knives into one or more of the plurality of channels and translating the one or more knives relative to the film or the film relative to the one or more knives in a direction substantially parallel to a large area surface of the film.

8. The method of claim 7 wherein the one or more knives comprises one or more blades having a cutting surface oriented at an angle greater than 0 degrees and less than 90 degrees to the large area surface of the film.

9. The method of claim 3 wherein the second cutting process comprises first contacting, with the second cutting device, the film at a large area surface of the film and the first cutting process comprises first contacting, with the first cutting device, the film at an edge of the film.

10. A lightguide formed from a light transmitting film using the method of claim 1.

11. A method of manufacturing a film-based lightguide, the method comprising:
cutting a film using a first cutting device in a first region the film to form first edge surfaces; and
cutting the film using a second cutting device different than the first cutting device in a second region of the film different than the first region of the film, to create lateral edge surfaces defining an array of coupling lightguides extending from a body of the film,
wherein an arithmetic mean roughness parameter of the lateral edge surfaces is less than an arithmetic mean roughness parameter of the first edge surfaces.

12. The method of claim 11 wherein the second cutting device cuts the film and forms lateral edge surfaces of the array of coupling lightguides with an optical quality surface finish.

13. The method of claim 11 wherein cutting a film using a first cutting device forms channel edges in the film defining an array of channels in the film.

14. The method of claim 13 further comprising inserting the second cutting device into the array of channels in the film.

15. The method of claim 14 wherein cutting a film using a first cutting device comprises first contacting, with the first cutting device, the film at a large area surface of the film and cutting the film using a second cutting device comprises first contacting, with the second cutting device, the film at one or more of the channel edges.

16. The method of claim 15 wherein the second cutting device comprises one or more knives and cutting the film using a second cutting device comprises creating the array of coupling lightguides simultaneously.

17. A method of forming a plurality of coupling lightguides in a film, the method comprising:
cutting a first region of the film using at least one first cutting device to form a plurality of first edge surfaces of the film defining a plurality of openings that do not extend into a body of the film;
inserting one or more knives through the plurality of openings; and
translating the one or more knives relative to the film or translating the film relative to the one or more knives after inserting the one or more knives through the plurality of openings to cut the film and form lateral edge surfaces defining lateral light reflecting surfaces of a plurality of coupling lightguides extending from the body of the film in a second region different than the first region.

18. The method of claim 17 wherein cutting a first region of the film comprises first contacting, with the at least one first cutting device, the first region of the film at a large area surface of the film and translating the one or more knives relative to the film or translating the film relative to the one or more knives comprises first contacting, with the one or more knives, the second region of the film at one or more of the plurality of edges.

19. The method of claim 17 wherein an arithmetic mean roughness parameter of the lateral edge surfaces is less than an arithmetic mean roughness parameter of the first edge surfaces.

20. The method of claim 17 wherein an arithmetic mean roughness parameter of the lateral edge surfaces is less than 500 nanometers.

* * * * *